US011553794B2

(12) United States Patent
Zhou et al.

(10) Patent No.: US 11,553,794 B2
(45) Date of Patent: Jan. 17, 2023

(54) FURNITURE ITEM WITH CONCEALED POWER LINE

(71) Applicant: eMoMo Technology Co., Ltd., Baoan (CN)

(72) Inventors: Wei Zhou, Wuhan (CN); Yushu Zhao, Shenzhen (CN); Ming Kong, Gaotieling Town (CN); Jingzhi Chen, Shenzhen (CN)

(73) Assignee: eMoMo Technology Co., Ltd., Baoan (CN)

( * ) Notice: Subject to any disclaimer, the term of this patent is extended or adjusted under 35 U.S.C. 154(b) by 225 days.

(21) Appl. No.: 17/013,138

(22) Filed: Sep. 4, 2020

(65) Prior Publication Data

US 2021/0068541 A1    Mar. 11, 2021

(30) Foreign Application Priority Data

Sep. 7, 2019   (CN) .......................... 201910844923.8

(51) Int. Cl.
| | |
|---|---|
| *F21V 33/00* | (2006.01) |
| *A47B 96/00* | (2006.01) |
| *F21V 23/00* | (2015.01) |
| *F21V 23/04* | (2006.01) |
| *H02G 3/04* | (2006.01) |
| *F21W 131/301* | (2006.01) |

(52) U.S. Cl.
CPC ............ *A47B 96/00* (2013.01); *F21V 23/001* (2013.01); *F21V 23/04* (2013.01); *F21V 33/0012* (2013.01); *H02G 3/0412* (2013.01); *H02G 3/0437* (2013.01); *A47B 2220/0077* (2013.01); *A47B 2220/0091* (2013.01); *F21W 2131/301* (2013.01)

(58) Field of Classification Search
CPC .... F21V 23/001; F21V 23/04; F21V 33/0012; F21V 33/0072; H02G 3/0412; H02G 3/0437; A47B 2220/0077; A47B 2220/0091; A47B 2220/0084; F21W 2131/301; A47C 7/725
See application file for complete search history.

(56) References Cited

U.S. PATENT DOCUMENTS

| | | | | | |
|---|---|---|---|---|---|
| 3,506,820 | A | * | 4/1970 | Shannon | ................ F21S 8/035 362/131 |
| 4,876,969 | A | * | 10/1989 | Infanti | .................. A47B 31/00 362/131 |
| 5,823,655 | A | * | 10/1998 | Brooks | .................. F21V 23/06 362/145 |
| 2004/0026998 | A1 | * | 2/2004 | Henriott | ................ A47B 97/00 307/9.1 |
| 2018/0241186 | A1 | * | 8/2018 | Gibboney, Jr. | ...... H02G 3/0462 |

* cited by examiner

*Primary Examiner* — Y M. Quach Lee
(74) *Attorney, Agent, or Firm* — Moyles IP, LLC

(57) ABSTRACT

A furniture item includes a main body with an electrical device installed thereon. A power line electrically connects the electrical device to an external power source and is concealed in a power line channel formed in one or more of the walls of the main body. A switch may be connected to the main body and electrically connected to the electrical device, for controlling the electrical device. A main body door moveable from a first position to a second position may trigger the switch to enable and disable electrical connection between the external power source and the electrical device.

13 Claims, 6 Drawing Sheets

FURNITURE ITEM WITH CONCEALED POWER LINE

CROSS-REFERENCE TO RELATED APPLICATIONS

This application claims priority to CN Patent Application No. 201910844923.8 filed Sep. 7, 2019, the entire contents of which are incorporated herein by reference in their entirety.

BACKGROUND OF THE DISCLOSURE

As living standards improve, the demand for a higher quality of life is steadily increasing. Traditional furniture can no longer meet people's requirements in daily life, giving way to more and more intelligent furniture in everyday life. For example, some furniture items, such as sofas and beds, are equipped with electrical devices to perform functions such as audio playback and lighting. The electrical device added to the furniture item can use an external power source to power the electrical device with the use of an exposed, external power line that electrically connects the electrical device to an external power source such as a wall socket. The exposed power line affects the overall visual appearance of the furniture item and use of the electrical device can be inconvenient due to the presence of the exposed power line. Further, use of the exposed power line over time can result in damage to the power line and corresponding risks of electric shock, damage to the electrical device, and an increased risk of electrical fire.

In view of the above deficiencies of exposed power lines used for providing power to electrical appliances in furniture items, a need exists for a furniture item equipped with an electrical appliance and concealed power line channel for safely maintaining the power line inside the furniture item and facilitating connection between the electrical appliance and an external power source without sacrificing aesthetics.

BRIEF DESCRIPTION OF THE EXEMPLARY EMBODIMENTS

In an aspect, the disclosure relates to a furniture item with a concealed power line. The furniture item may have a main body and an electrical device including a power supply contact installed on the main body. An electrical device connecting port may be formed in the main body and open to the power supply contact of the electrical device. A first power line channel portion may be formed in the main body, open to the electrical device connecting port, and in open communication with the power supply contact via the electrical device connecting port. A power line may be positioned within the first power line channel portion and electrically connected to the power supply contact of the electrical device.

In another aspect, the disclosure relates to a furniture item with concealed power line connections. The furniture item may have a main body and an electrical device installed on the main body. The electrical device may include a power supply contact, and an electrical device connecting port formed in the main body may be open to the power supply contact of the electrical device. A first power line channel portion may be formed in the main body and open to the electrical device connecting port. The first power line channel portion may be in open communication with the power supply contact of the electrical device, via the electrical device connecting port. A first power line may be positioned within the first power line channel portion and electrically connected to the power supply contact of the electrical device. The furniture item may also include an access port and a switch connected to the main body, and a portion of the first power line channel portion may be adjacent to the switch and in open communication with the electrical device connecting port. In further aspect, an adjacent power line channel portion may be formed in the main body, adjacent to each of the first power line channel portion and the switch. The adjacent power line channel portion may be in open communication with the access port, and a second power line may be positioned in the adjacent power line channel portion. Each of the first power line and the second power line may be electrically connected to the switch, and the electrical device and the switch may be in electrical communication via the first power line.

In another aspect, the disclosure relates to a furniture item with a concealed power line connection. The furniture item may have a main body and an electrical device including a power supply contact installed on a first wall of the main body. An electrical device connecting port may be formed in the main body and open to the power supply contact of the electrical device. A first power line channel portion may be formed in the first wall, open to the electrical device connecting port, and in open communication with the power supply contact of the electrical device via the electrical device connecting port, and a second power line channel portion may be formed in a second wall of the main body that extends transverse to the first wall. A portion of the second wall may abut a portion of the first wall, and the first power line channel portion and the second power line channel portion may respectively extend to the abutting portions of the first wall and the second wall. The first power line channel portion and the second power line channel portion may be open to each other at the abutting portions. An access port may be formed in the second wall, and the second power line channel portion may be open to the access port. Accordingly, the first power line channel portion and the second power line channel portion together may form a power line channel extending from the access port to at least the electrical device connecting port.

BRIEF DESCRIPTION OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which.

Figure 1:
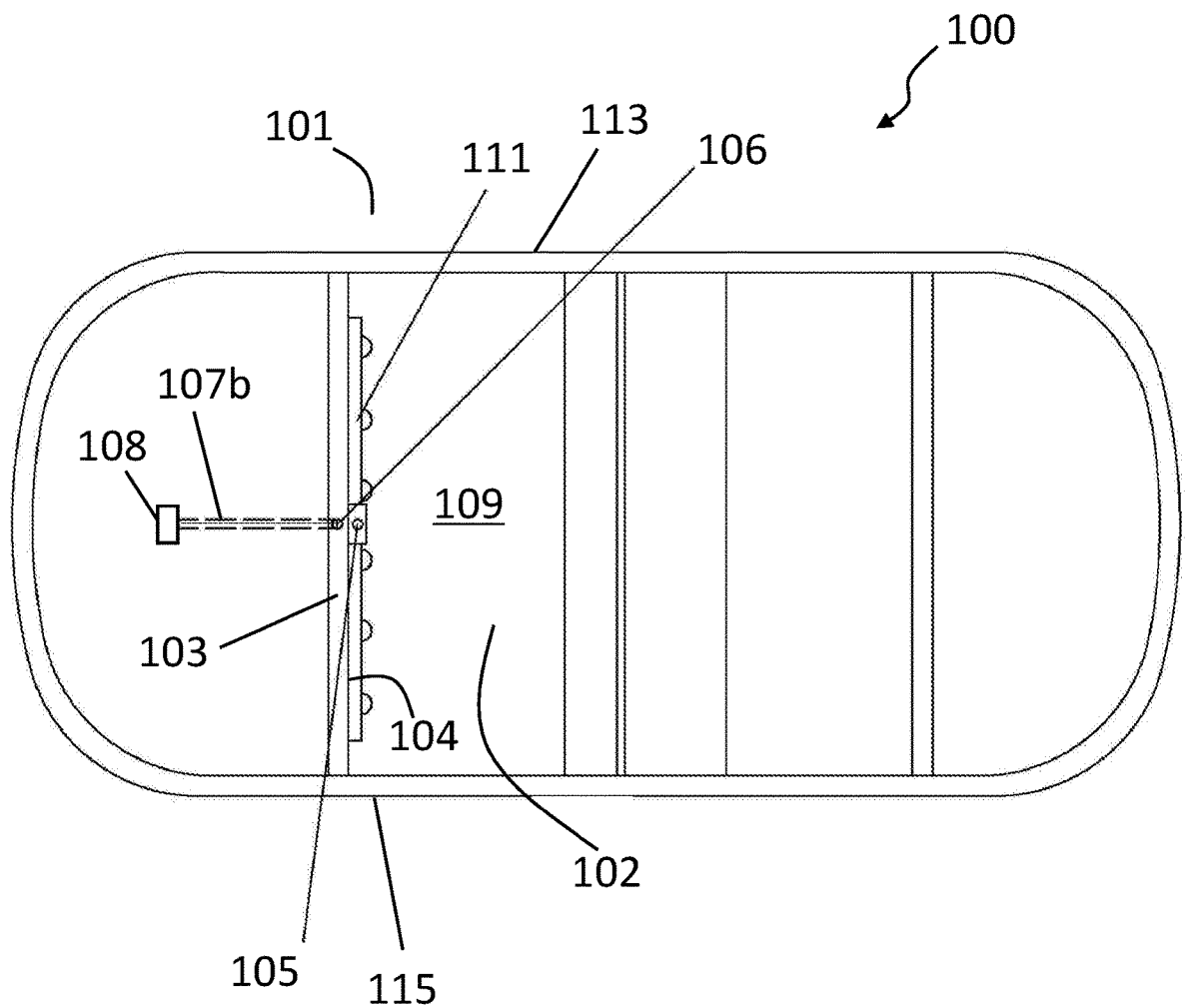
FIG. 1 is a front view of a furniture item with a concealed power line, according to an exemplary embodiment.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to emphasize specific features relevant to some exemplary embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various exemplary embodiments. Each example is provided by way of explanation and is not meant as a limitation and does not constitute a definition of all possible embodiments.

For purposes of this disclosure, "connection" or "connected" may refer to an electrical connection and/or a physical connection, as the disclosure makes clear. In the context of an electrical connection, "connection" and "connected" respectively mean a conductive electrical contact or communication and in conductive electrical contact or communication, including, for example and without limitation, one or more physical connections between conductive components, either directly or through intermediate conductive components or relays, through which electricity is transmitted and/or transferred. The terms "electrical" and "electric" may be used interchangeably and refer to power aspects of electricity and associated components including, among other things, power supplies, power connections and relays, devices powered by electricity, and the like, except where the disclosure otherwise makes clear.

Where the disclosure makes clear that "connection" or "connected" refers to a purely physical connection, "connection" and "connected" respectively mean a physical joining and physically joined by any known technique, including integrally formed as single, integral piece.

For purposes of this disclosure, relative terms including, without limitation, "top", "bottom", "upper", "lower", "above", "below", "within", etc. are used to aid the description of, e.g., configurations of features as shown in the accompanying figures, and otherwise as the disclosure makes clear. Such relative terms do not imply any particular dimension or delineation of or between features except where the disclosure makes clear.

For purposes of this disclosure, terms including, without limitation, "first", "second", "third" and "fourth" are used for descriptive purposes only and without limitation with respect to, e.g., an ordering of process steps, function, or configuration.

Reference is made herein to the exemplary embodiment(s) of a furniture item with a concealed power line channel and components thereof.

In an aspect, an access port is provided in the furniture item main body, and the power line channel extends from the access port. A power connector may be provided in the access port for electrical connection to an external power source. The power line may be electrically coupled to the power connector for electrical connection between the power line and the external power source. The power line may extend from the power connector via the power line channel along at least one wall of the furniture item main body.

In an aspect, the furniture item is a cabinet and an electrical device, such as a lamp, is installed in an internal cavity of the cabinet and electrically connected to the power line. The electrical device may be installed on a wall of the main body of the furniture item and accessible by the power line/power line channel via an electrical device connection port opening to and extending from the power line channel and through the wall. The power line channel may extend along one or more walls of the main body between the power connector and at least the electrical device connection port, and the power line may be provided in the power line channel and serve to electrically connect the power connector and the electrical device, thereby electrically connecting the electrical device to the external power source.

In an aspect, more than one power line channel may be formed in one or more of the walls, for individually retaining one or more power lines in each power line channel. In a further aspect, the two or more power line channels may be formed in a parallel relationship to one another in each respective wall. Alternatively, two or more power lines may be positioned within a single power line channel.

In an aspect, a switch is provided on an external surface of a wall of the furniture item main body. The switch may be installed on the furniture item with a screw. One or more power line channels may extend respectively from the electrical device connection port to the switch and from the switch to the power connection/access port. Connection(s) for electrically connecting the switch to one or more power lines within the one or more power line channels may be conductive wiring screws that connect the switch to the wall and extend into installed through the power line channel to contact and electrically connect the power line to the switch.

In an aspect, generally, one or more power line channels may extend from each of the power connector, the electrical connection port, and the switch to the others.

For purposes of illustrating features of the embodiments, an exemplary embodiment will now be introduced and referenced throughout the disclosure. It will be understood that this example and other exemplary embodiments described in this disclosure are illustrative and not limiting and are provided for illustrating the exemplary features of a furniture item equipped with an electrical device and a concealed power line.

With reference to FIG. 1, an exemplary embodiment of a furniture item 100 includes a main body 101 formed from a plurality of walls (e.g., 103, 109, 113, 115). The furniture item 100 includes at least one electrical device 111 installed on the main body 101, for example, on one of the walls 103. With additional reference to FIG. 4, in which a cross-sectional view of an isolated portion of the main body 101 is shown according to an exemplary embodiment, a first wall 103 on which the electrical device 111 is installed abuts a second wall 109 extending transverse to the first wall 103. A first power line channel portion 107*a* is formed in the first wall 103 and a second power line channel portion 107*b* is formed in the second wall 109. Each of the first power line channel portion 107*a* and the second power line channel portion 107*b* is formed as a lengthwise bore within and/or through a corresponding wall 103, 109. The first power line channel portion 107*a* and the second power line channel portion 107*b* are open to each other at abutting portions of the first wall 103 and the second wall 109, and together the first power line channel portion 107*a* and the second power line channel portion 107*b* form a power line channel 107 extending from an access port 108 and along a length L of the first wall 103. The power line channel 107 may have any overall length L and may take any configuration according to particular furniture items, consistent with this disclosure.

Figure 4:
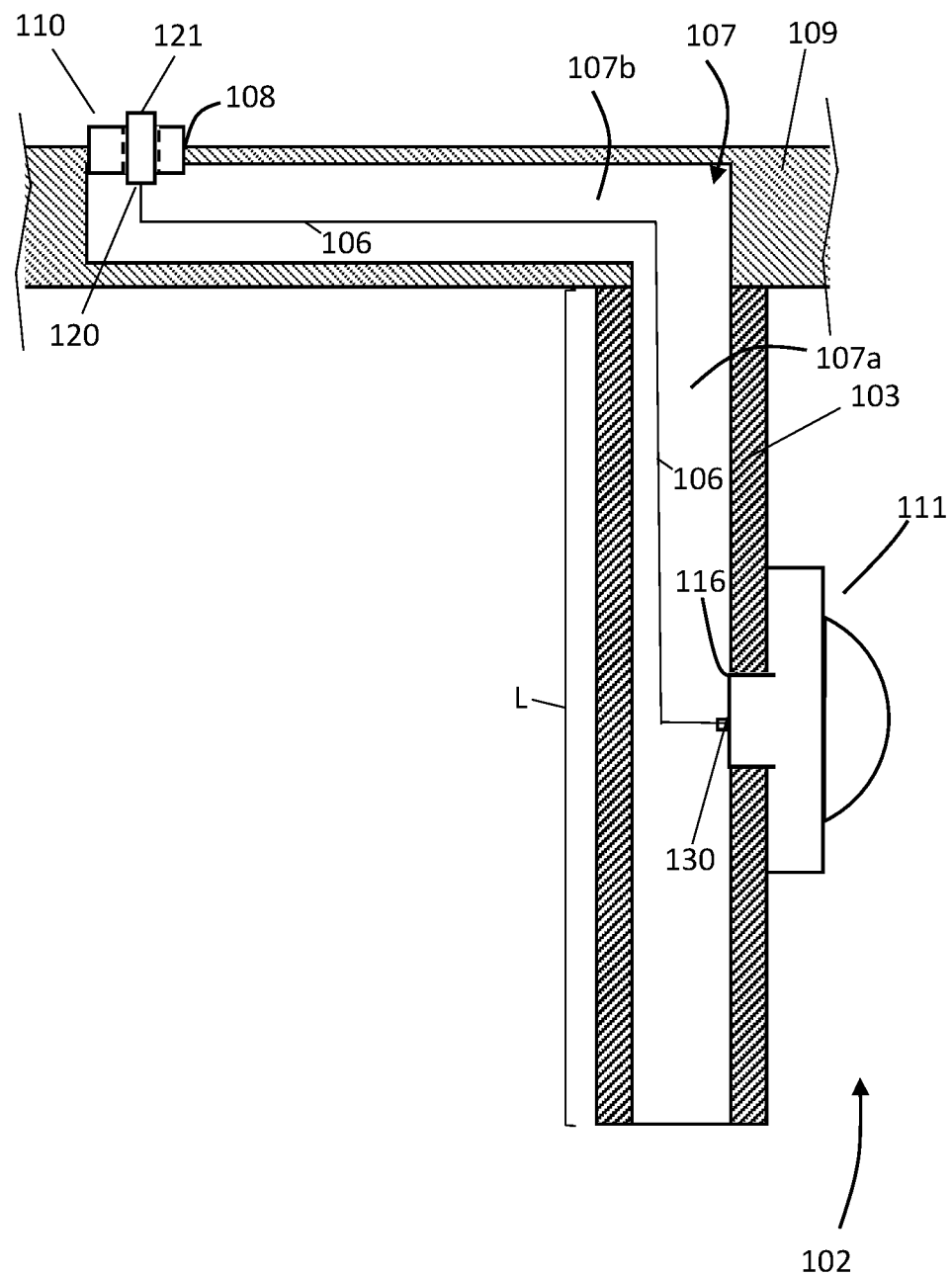
FIG. 4 is a cross-sectional view of a concealed power line channel and associated electrical components in a portion of a furniture item, according to an exemplary embodiment.

With continuing reference to the exemplary embodiments shown in FIGS. 1 and 4, the first power line channel portion 107*a* includes an electrical device connecting port 116 through which the first power line channel portion 107*a* is in open communication with at least a portion of the electrical device 111 including at least one conductive power supply contact 130, as are well known. For purposes of this disclosure, "in open communication" means accessible through a continuous, i.e., uninterrupted by a physical barrier, but not necessarily uniformly shaped or oriented path. For example, the electrical device 111 is accessible from the first power line channel portion 107*a*, through the electrical device connecting port 116 which is formed as a bore in the first wall 103. The electrical device connecting port 116, in the exemplary embodiment shown in, e.g., FIG. 4, is open to and extends transversely from the first power line channel portion 107*a* to the conductive power supply contact 130 of the electrical device 111. The power supply contact 130 is electrically connected to a power line 106 or other known power source/supply or relay positioned within the first power line channel portion 107*a*.

The power line 106 extends through the power line channel 107 from the access port 108 to the power supply contact 130 as in the exemplary embodiment shown in, e.g., FIG. 4. The access port 108 may be or house a power connector 110 electrically connected at a first power connector contact point 120 to the power line 106 within the second power line channel portion 107*b*. The exemplary power connector 110 may include a second power connector contact point 121 opposite and spaced apart from the first power connector contact point 120 and positioned external to the main body 101. The second power connector contact point 121 may be configured for electrically connecting to a power source, such as, without limitation, a wall socket type power plug or adapter therefore, through known connections and techniques such as cables, cords, and the like. In use, the power connector 110 relays power from the electrical power source to the power line 106, which is concealed within the power line channel 107 and connected to the power supply contact 130 of the electrical device 111, for providing power to the electrical device 111. In an exemplary embodiment, each of at least the first wall 103 and the second wall 109 of the main body 101 are formed from a sheet of spliced material, and the first power line channel portion 107*a* and the second power line channel portion 107*b* are formed within the sheets of spliced material of the respective first wall 103 and the second wall 109.

With reference back to FIG. 1, the furniture item 100 in an exemplary embodiment is a cabinet-type furniture item and the plurality of walls 103, 109, 113, 114, 115 define at least one internal cavity 102 such as a cabinet. The electrical device 111 is installed on the first wall 103, within the internal cavity 102. According to an aspect, the electrical device 111 may be, without limitation, a lamp for illuminating the internal cavity 102. In other embodiments, the electrical device 111 may be any electrical device, for example, a loudspeaker. The power line 106 is electrically coupled to the electrical device 111 and extends from the electrical device 111 to the access port 108 which is formed in the second wall 109 of the main body 101. The power line channel 107 conceals the power line 106 therein. The configuration of the power line channel 107, the access port 108, the electrical device 111, and other components is not limited to the exemplary embodiments. The disclosed components may be located in any position on any portion of a furniture item 100 (which is not limited to any particular furniture item(s)) and/or a main body 101 of a furniture item as different applications dictate, consistent with the disclosure. In some embodiments, the electrical device 111 may be located on an outside or external portion of the main body 101 and conveniently accessible by a user.

Figure 5:
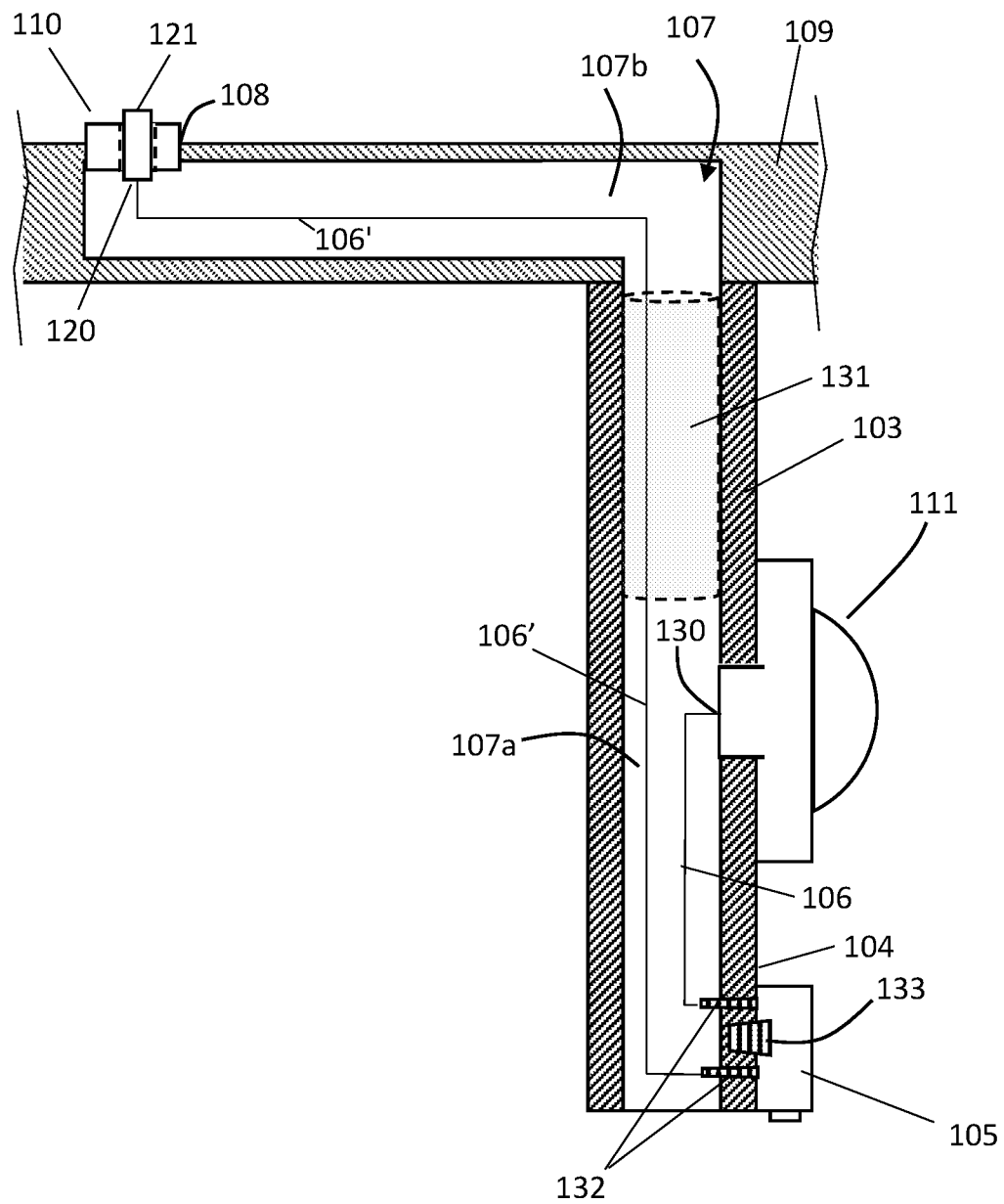
FIG. 5 is a cross-sectional view of a concealed power line channel and associated electrical components in a portion of a furniture item, according to an exemplary embodiment.
Figure 6:
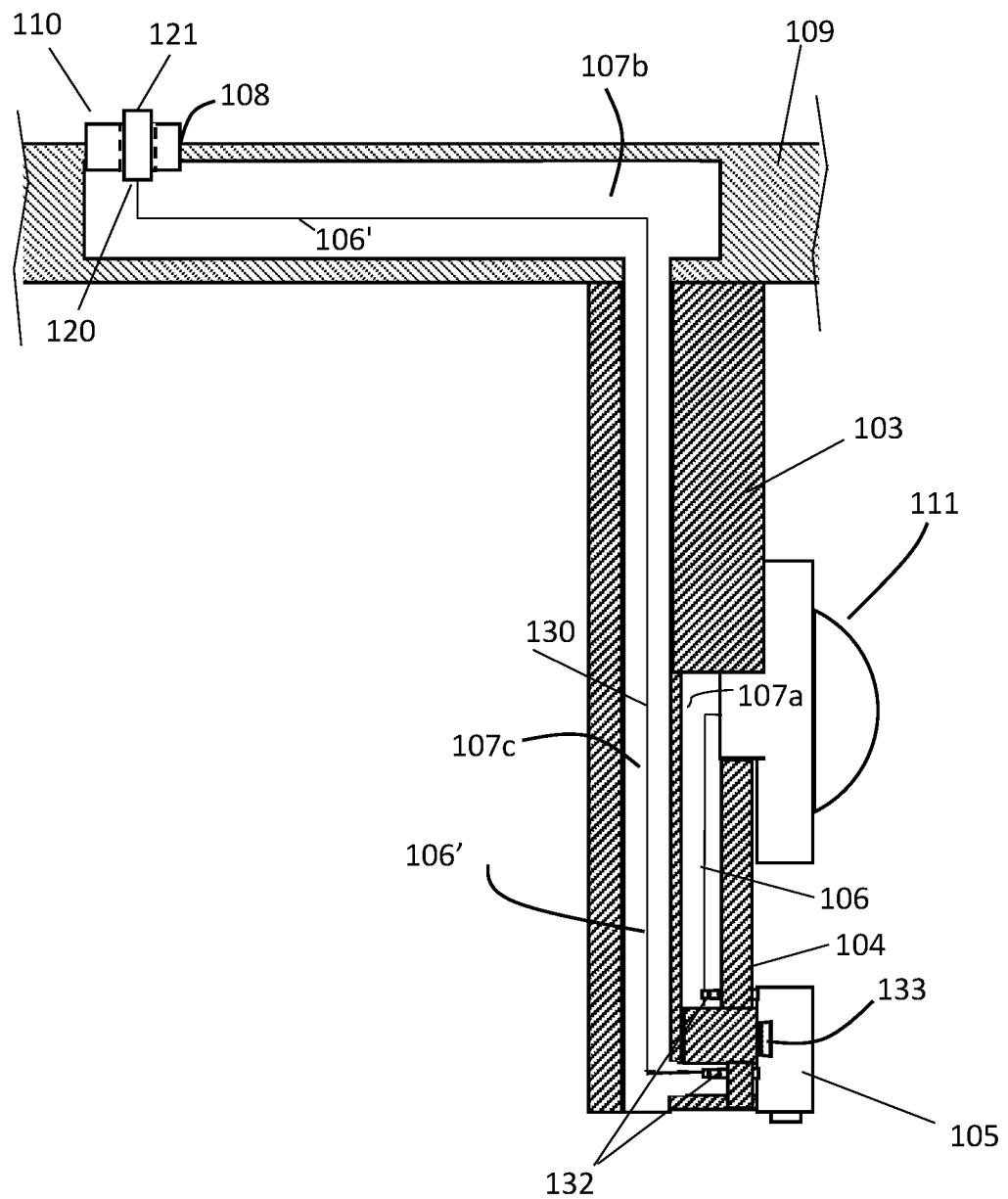
FIG. 6 is a cross-sectional view of concealed power line channels and associated electrical components in a portion of a furniture item, according to an exemplary embodiment.

According to an aspect, the power line channel 107 including the first power line channel portion 107*a* and the second power line channel portion 107*b*, and others according to varying configurations, may be formed in one or more of the walls 103, 109 of the furniture item main body 101 during manufacture. In an aspect, the furniture item walls may be made from material(s) that are spliced into sheets, and the power line channel 107 may be formed in the constituent materials before splicing, as a deformation between the materials during splicing, or by other known techniques consistent with this disclosure. The main body 101 including the walls 103, 109, 113, 114, 115 may be formed from known materials suitable for such use in furniture items, including without limitation, wood, plywood, particle board, fiberboard, laminated timber, and the like, that is spliced to form sheets of material. The power line channel 107 may be sized and shaped to retain one or more power lines (FIGS. 5 and 6).

In an aspect, a hardware conduit 131 (FIG. 5) such as a pipe may be installed in at least a portion of the power line channel 107 and the power line 106 may be positioned within the hardware conduit 131. The hardware conduit 131 may be shaped complementarily to the power line channel 107 so as to fit snugly within. For example, the hardware conduit 117 may be a pipe having a diameter less than the power line channel 107 and may be embedded in the power line channel 107. In an aspect, the hardware conduit 117 has an internal diameter greater than the diameter of the power line 106 to enable the power line 106 to be positioned within the interior of the hardware conduit 117. In an aspect, the hardware conduit 131 may be formed from a fireproof or fire-resistant material to prevent energy or fire from potential electrical events, overheating, etc. from contacting/igniting the furniture item main body 101 which may be flammable.

Figure 2:
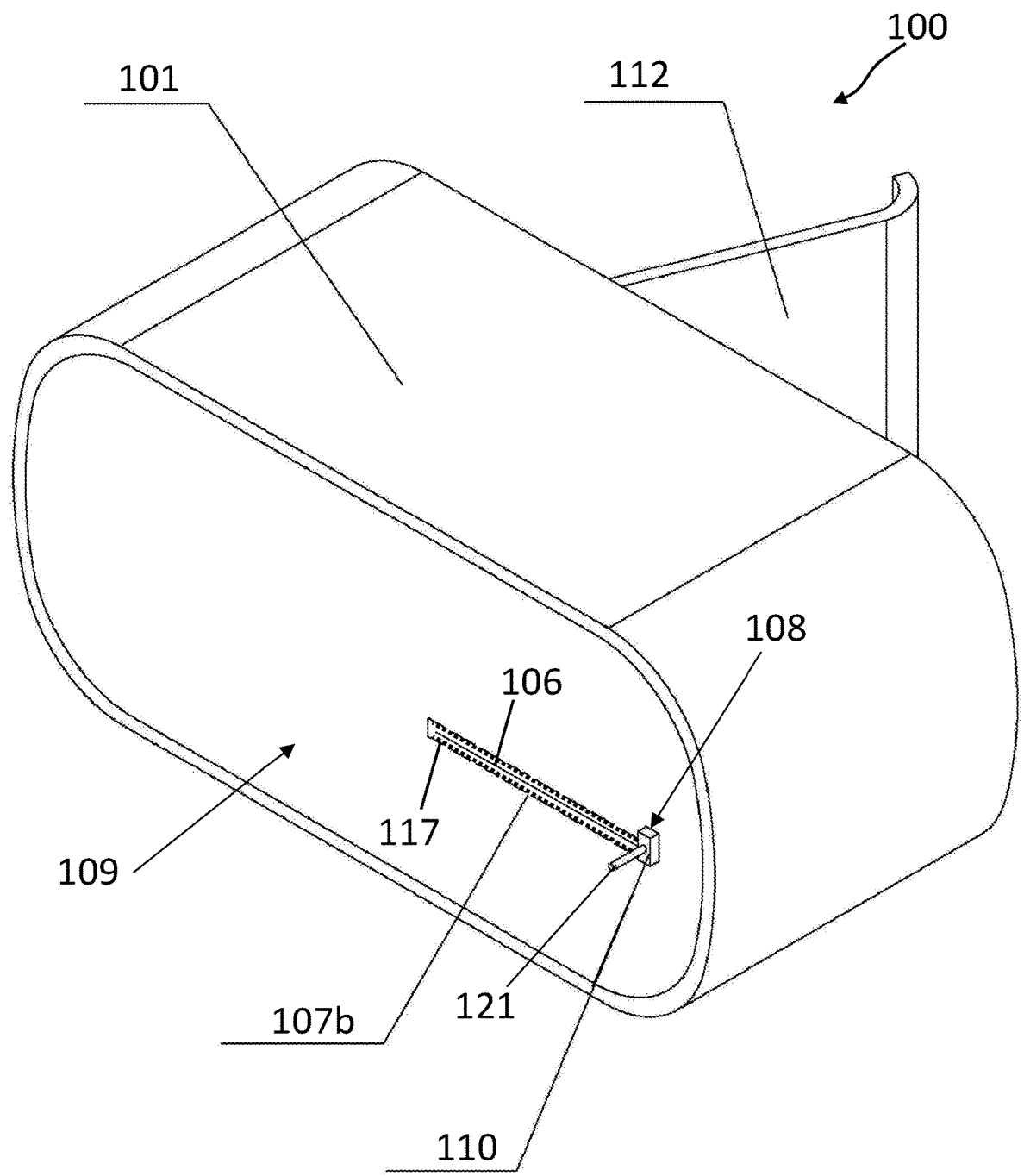
FIG. 2 is a rear, top perspective view of a furniture item with a concealed power line, according to an exemplary embodiment.

With reference now to FIG. 2, a rear perspective view of an exemplary furniture item 100 and main body 101 is shown. The second power line channel portion 107*b* is shown in phantom in the second wall 109. With additional reference to FIGS. 1 and 4, the second power line channel portion 107*b* extends from a position corresponding to the abutting portions of the first wall 103 (not shown) and the second wall 109, to the power connector 110 installed in the second wall 109. In an aspect, the access port 108 may be an opening through the second wall 109, within which the power connector 110 is positioned, or the power connector 110 may be installed directly in the second wall 109 and function as an access port. The second power connector contact point 121 in the exemplary embodiment is positioned outside of the main body 101, for connecting to a power source.

According to an aspect, a diameter or other dimensions (the geometry of the power line channel 107 is not limited by this disclosure) of the power line channel 107 may vary depending on, among other things, the thickness of the sheet of material forming the walls 103, 109 of the furniture item 100. For example, the diameter of the power line channel 107 may be greater when the wall(s) 103, 109 within which the power line channel 107 is formed have a greater thickness, and the diameter of the power line channel 107 may be smaller when the walls 103, 109 have a smaller thickness. In an aspect, two or more power lines 106, 106' for electrical connection to more than one electrical device or more than one external power source may be positioned within the power line channel 107 (e.g., FIG. 5). Each power line 106, 106' may be an insulated conductor to prevent short circuits, arcing, or other electrical interactions. In a further aspect, more than one power line channel 107, 107' may be formed in one or more walls 103, 109 of the main body 101 for retaining a power line 106, 106' in each of the power line channels (e.g., FIG. 6). According to an aspect, two or more power line channels may be formed in a parallel relationship to one another along a wall of the main body 101.

Figure 3:
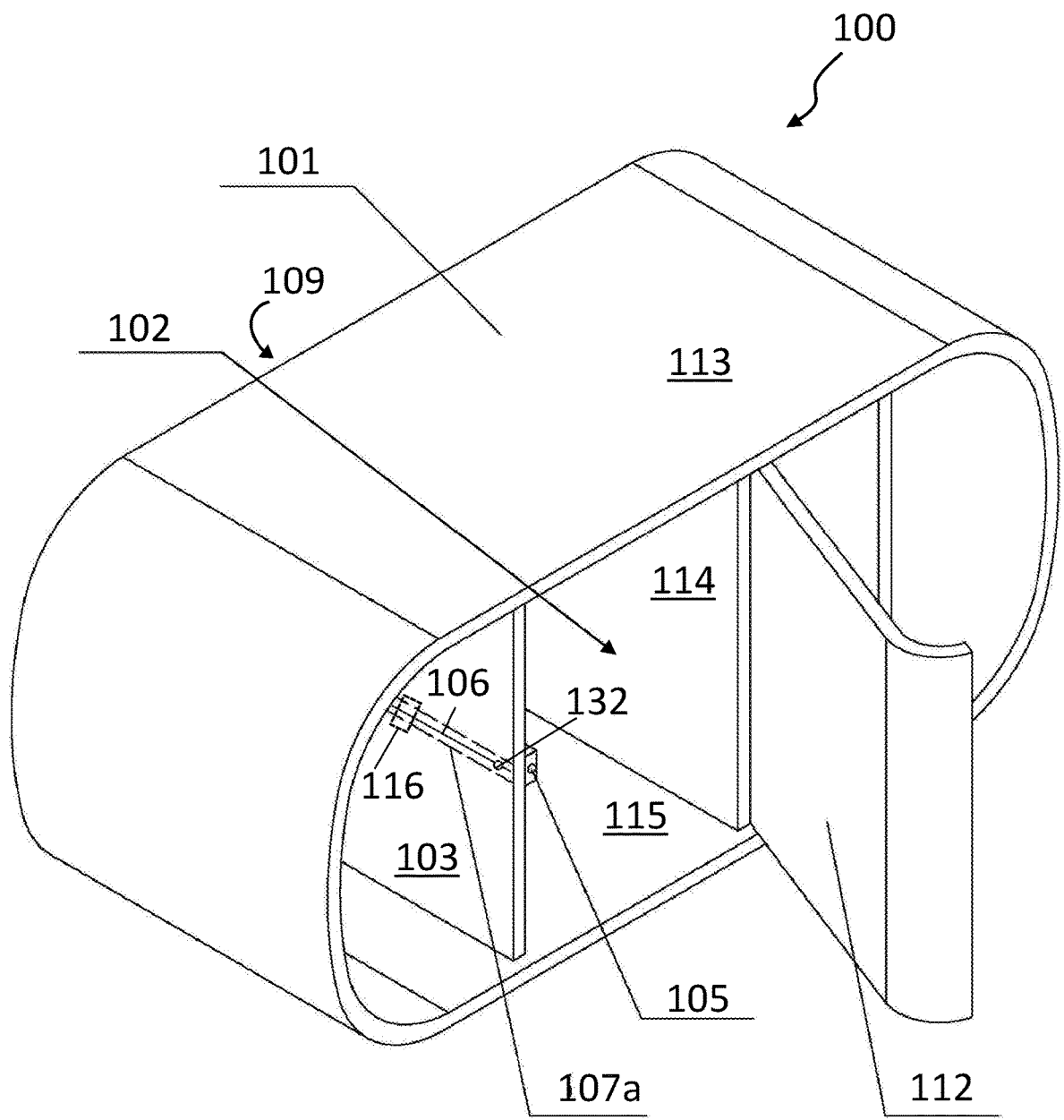
FIG. 3 is a front, top perspective view of the furniture item of FIG. 1, according to an exemplary embodiment.

With reference to FIG. 3, a front perspective view of an exemplary furniture item 100 is shown. In the exemplary embodiment, and with further reference to FIG. 4, the electrical device connection port 116 is shown in phantom as it would be formed in the first wall 103 and positioned within the internal cavity 102. The electrical device 111 may be installed in the internal cavity 102 and electrically connected to the power line 106, within the power line channel 107, through electrical device connection port 116. In various embodiments, the electrical device connection port 116 may include a conductive component positioned within the electrical device connection port 116 and thereby serve as an electrical coupling between the power line 106 and the electrical device 111.

Within continuing reference to FIG. 3, and further reference to FIGS. 5 and 6, in an exemplary embodiment a switch 105 is provided on the first wall 103 and is electrically coupled to the electrical device 111 via power line 106 which is electrically connected to each of the switch 105 and the electrical device 111. The switch 105 may include a first, output wiring screw 132 that provides a conductive contact between the switch componentry and the power line 106. The wiring screw 132 may extend through a portion of the first wall 103 and connect to the power line 106 within the power line channel 107. The switch 105 may be attached to the first wall 103 by a conventional screw 133 or other known techniques. The switch 105 may be any known switch-type controller for controlling function of an electrical device via power supply; for example and without limitation, the switch 105 may be a key switch, a touch switch, a photoelectric switch, a magnetic switch, or a Hall element.

The switch 105 may include a second, input wiring screw 132 that is connected to a second power line 106' that provides electrical communication between the switch 105 and the power connector 110. Accordingly, power is supplied to the switch 105 via the second power line 106' and the switch 105 controls output along the power line 106 to the electrical device 111, to control operation of the electrical device 111.

The configuration and operation of the switch 105 including the number of wiring screws 132 and corresponding power lines 106 required to make the appropriate electrical connections is not limited by this disclosure and includes any such known switch designs, whether currently known or otherwise similarly-functioning, consistent with this disclosure.

In an aspect, the switch 105 is installed on the first wall 103 via at least one screw 133. In an aspect, the screw 133 may be a conventional screw or may be one of the wiring screw(s) 132 as discussed above.

The switch 105 may be provided on an exterior surface 104 of the first wall 103 of the furniture item main body 101 for ease of access for manual use by a user. In an aspect, a body door 112 may trigger the switch 105 when moved by the user to engage the switch 105. The body door 112 may be coupled to one or more walls of the main body 101, for example, wall 114, and moveable from a first position to a second position. In the first position, shown in FIGS. 2 and 3, the body door 112 is open and the contents of the internal cavity 102 are visible. In the first position, the switch 105 is disengaged to enable electrical connection between the electrical device 111 and the external power source, thereby powering on the electrical device 111. When moved to the second position, the body door 112 seals the internal cavity 102. In the second position, the body door 112 engages the switch 105 to power off the electrical device 111 by disabling electrical connection between the electrical device 111 and the power connector 110/external power source. In an aspect, if the user does not completely move the body door 112 from the first position to the second position, and the internal cavity 102 is not sealed, then the switch 105 remains disengaged and, e.g., a light or sound signal emitted from the electrical device 111 may notify the user to close the body door 112.

With reference now to FIG. 5, a cross-sectional view of an isolated portion of an exemplary furniture item main body 101 including a switch 105, according to an exemplary embodiment, is shown. Portions and components of the furniture item 100 and main body 101 that have been previously are not repeated here although the above disclosures, and this disclosure as a whole, form a part of the description of FIGS. 5 (and 6, discussed below).

In the exemplary embodiment shown in FIG. 5, the switch 105 is attached to an external surface 104 of the first wall 103 by the conventional screw 133 and two wiring screws 132. The first wiring screw 132 and the second wiring screw 132 are respectively connected to the (first-) power line 106 and the second power line 106'. The first power line 106 is electrically connected to each of the electrical device power supply contact 130 and the first wiring screw 132 and thereby places the electrical device 111 and the switch 105 in electrical communication. The second power line 106' is electrically connected to each of the second wiring screw 132 and the power connector 110 (at the first contact point 120) and thereby places the switch 105 and the power connector 110/external power supply in electrical communication.

With reference now to FIG. 6, a cross-sectional view of an isolated portion of an exemplary furniture item main body 101 including a switch 105, according to another exemplary embodiment, is shown. In the exemplary embodiment shown in FIG. 6, which is otherwise substantially the same as FIG. 5, the first wall 103 has two power line channel portions 107a, 107c formed therein—the first power line channel portion 107a in which the first power line 106 is positioned, and an adjacent power line channel portion 107c in which the second power line 106' is positioned. The first power line channel portion 107a and the adjacent power line channel portion 107c are shown in a parallel relationship in FIG. 6. The adjacent power line channel portion 107c extends and opens to the second power line channel portion 107b in the same manner as previously discussed with respect to the first power line channel portion 107a in exemplary embodiments having only one power line channel portion in the first wall 103.

As used throughout this disclosure, "adjacent" means near or in relative proximity but is not limited to any particular dimensions or spacing, except where otherwise made clear by the disclosure, and further includes configurations in which components are "adjacent" for purposes of accomplishing a function such as making an electrical connection or opening to an electrical contact. For example and without limitation, each power line channel portion 107a, 107b, 107c may have one or more portions adjacent to a portion of the main body 101, a different power line channel portion, an electrical contact component, an electrical device (including a switch), a connecting or fastening component, etc.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A furniture item with a concealed power line, comprising:
    a main body;
    an electrical device installed on the main body and including a power supply contact;
    an electrical device connecting port formed in the main body, wherein the electrical device connecting port is open to the power supply contact of the electrical device;
    a first power line channel portion formed in the main body, wherein the first power line channel portion is open to the electrical device connecting port and in open communication with the power supply contact of the electrical device, via the electrical device connecting port;
    a first power line positioned within the first power line channel portion and electrically connected to the power supply contact of the electrical device;
    a second power line positioned within the first power line channel portion;
    a switch connected to the main body; and
    an access port, wherein
    a portion of the first power line channel portion is adjacent to the switch, and the portion of the first power line channel portion adjacent to the switch is in open communication with each of the access port and the electrical device connecting port, and
    the first power line is electrically connected to the switch, and the electrical device and the switch are in electrical communication via the first power line.

2. The furniture item of claim 1, wherein the access port includes a power connector connected to the power line at a first contact point and including a second contact point in open communication with an outside of the main body.

3. The furniture item of claim 1, wherein a portion of the main body within which the first power line channel portion is formed from a sheet of spliced material.

4. The furniture item of claim 1, wherein the second power line is electrically connected to the switch.

5. The furniture item of claim 1, wherein an electrical connection of the switch is a wiring screw, wherein the wiring screw extends from the switch into the main body, and the first power line channel portion is in open communication with the wiring screw.

6. The furniture item of claim 5, wherein the wiring screw is electrically connected to one of the first power line and the second power line.

7. The furniture item of claim 1, further comprising a body door coupled to the main body and moveable from a first position to a second position, wherein
in the first position, the body door disengages the switch to power on the electrical device; and
in the second position, the body door engages the switch to power off the electrical device.

8. The furniture item of claim 1, further comprising a hardware conduit positioned within the first power line channel portion, wherein the first power line is positioned within the hardware conduit.

9. The furniture item of claim 8, wherein the hardware conduit is formed from a fireproof material.

10. The furniture item of claim 1, wherein the main body includes a plurality of walls defining at least one internal cavity, and the electrical device is an illuminating lamp installed on a first wall of the plurality of walls and positioned within the internal cavity.

11. A furniture item with concealed power line connections, comprising:
a main body;
an electrical device installed on the main body and including a power supply contact;
an electrical device connecting port formed in the main body, wherein the electrical device connecting port is open to the power supply contact of the electrical device;
a first power line channel portion formed in the main body, wherein the first power line channel portion is open to the electrical device connecting port and in open communication with the power supply contact of the electrical device, via the electrical device connecting port;
a first power line positioned within the first power line channel portion and electrically connected to the power supply contact of the electrical device;
an access port;
a switch connected to the main body, wherein a portion of the first power line channel portion is adjacent to the switch and in open communication with the electrical device connecting port;
an adjacent power line channel portion formed in the main body and positioned adjacent to each of the first power line channel portion and the switch, wherein the adjacent power line channel portion is in open communication with the access port; and
a second power line, wherein the second power line is positioned in the adjacent power line channel portion, each of the first power line and the second power line is electrically connected to the switch, and the electrical device and the switch are in electrical communication via the first power line.

12. The furniture item of claim 11, wherein the adjacent power line channel portion is in a parallel relationship with the first power line channel portion.

13. The furniture item of claim 11, further comprising a body door coupled to the main body and moveable from a first position to a second position, wherein
in the first position, the body door disengages the switch to power on the electrical device; and
in the second position, the body door engages the switch to power off the electrical device.

* * * * *